United States Patent
Campbell et al.

(10) Patent No.: US 11,228,193 B2
(45) Date of Patent: Jan. 18, 2022

(54) SERIAL SOC TESTING FOR IMPROVED FAST-CHARGE ALGORITHM

(71) Applicant: CHONGQING JINKANG POWERTRAIN NEW ENERGY CO., LTD., Chongqing (CN)

(72) Inventors: Brennan Campbell, Santa Clara, CA (US); Saeed Khaleghi Rahimian, San Jose, CA (US); Joseph Tolentino, Tracy, CA (US); Yifan Tang, Santa Clara, CA (US); Ying Liu, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 169 days.

(21) Appl. No.: 16/237,503

(22) Filed: Dec. 31, 2018

(65) Prior Publication Data

US 2020/0212684 A1 Jul. 2, 2020

(51) Int. Cl.
*H02J 7/00* (2006.01)
*H01M 10/0525* (2010.01)
*H01M 10/44* (2006.01)
*H01M 10/42* (2006.01)

(52) U.S. Cl.
CPC ......... *H02J 7/007* (2013.01); *H01M 10/0525* (2013.01); *H01M 10/4257* (2013.01); *H01M 10/44* (2013.01); *H01M 2010/4271* (2013.01); *H01M 2010/4278* (2013.01); *H01M 2220/20* (2013.01)

(58) Field of Classification Search
CPC ....................................................... H02J 7/007
USPC .............................................................. 320/162
See application file for complete search history.

(56) References Cited

U.S. PATENT DOCUMENTS

| | | | |
|---|---|---|---|
| 2017/0234930 A1* | 8/2017 | Lee ...................... | H01M 10/48 320/162 |
| 2018/0145531 A1* | 5/2018 | Jung .................... | G01R 31/382 |
| 2020/0169107 A1* | 5/2020 | Joshi ..................... | H02J 7/0047 |

* cited by examiner

*Primary Examiner* — Edward Tso
*Assistant Examiner* — Ahmed H Omar
(74) *Attorney, Agent, or Firm* — Cooper Legal Group, LLC

(57) ABSTRACT

An automatically generated and customized fast charging process results in reduced degradation in the battery cell. An algorithm for a particular battery cell profile is automatically generated and customized to minimize degradation due to fast charging for that particular batch. To generate the custom algorithm, battery cell information is retrieved for a profile of a battery, wherein each battery profile may have a particular manufacturer, model, type, electrode batch, and potentially other specific identification information. Each battery cell is charged from a particular SOC level and at a selected C-rate, and then discharged. During discharge, the battery cell is monitored for detection of lithium plating or other undesirable effects. A lookup table is automatically generated from the battery cell information, and can be provided to devices and/or battery management systems. The BMS then uses the lookup table to apply a charging process that is customized to the on-board battery.

15 Claims, 9 Drawing Sheets

500

| SOC Range | collected data | | | | optimal C-rate? |
|---|---|---|---|---|---|
| | cell ID | cell SOC | cell C-Rate | Plating detected | |
| 0-30 | 1 | 15 | 1.5 | yes | no |
| | 2 | 20 | 1.4 | no | yes |
| | 3 | 22 | 1.3 | no | no |
| 30-35 | 4 | 32 | 1.4 | no | yes |
| | 5 | 31 | 1.3 | no | no |
| | 6 | 34 | 1.2 | no | no |
| 35-40 | 7 | 37 | 1.4 | yes | no |
| | 8 | 38 | 1.3 | yes | no |
| | 9 | 39 | 1.2 | no | yes |
| 40-45 | 10 | 43 | 1.2 | yes | no |
| | 11 | 40 | 1.1 | no | yes |
| | 12 | 42 | 1 | no | no |

| 25°C Lookup Table ||||
| SOC | C-rate | Voltage (V) | Current (A) |
| --- | --- | --- | --- |
| 50 | 2 | 4 | 24 |
| 55 | 1.6 | 4.02 | 19.2 |
| 65 | 1.4 | 4.04 | 16.8 |
| 70 | 1.3 | 4.05 | 15.6 |
| 75 | 1 | 4.057 | 12 |
| 80 | 0.9 | 4.1 | 10.8 |

FIGURE 6

SERIAL SOC TESTING FOR IMPROVED FAST-CHARGE ALGORITHM

BACKGROUND

Lithium-ion battery cells are w in a commonly used in wide range of products, including electronic vehicles cell phones, computers, electric vehicles, and other systems. One advantage of lithium ion batteries is that they may be "fast charged," allowing the cells to be charged faster than other battery types. Typical fast charge techniques include charging at a constant current and constant voltage, which has the undesirable side-effect of incurring severe chemical and mechanical degradation mechanisms within the battery cell. In particular, typical fast charging techniques cause degradation due to higher currents, higher temperature rise, swelling characteristics of the active materials, the mass transport limitations in the anode, risks of overcharging or excess electrolyte decomposition, and decomposition of lithium metal on the anode. For these reasons, fast-charging techniques of lithium batter cells negatively affect the life and continued capacity of the battery.

SUMMARY

The present technology provides improvements to fast charging methodologies for lithium-ion battery cells that prolong the life and continued capacity of the battery. The improvements provide an automatically generated and customized fast charging process that results in reduced degradation in the battery cell. An algorithm for a particular battery cell profile is automatically generated and customized to minimize degradation due to fast charging for that particular batch. To generate the custom algorithm, battery cell information is retrieved for a profile of a battery, wherein each battery profile may have a particular manufacturer, model, type, electrode batch, and potentially other specific identification information. Each battery cell is charged from a particular SOC level and at a selected C-rate, and then discharged. During discharge, the battery cell is monitored for detection of lithium plating or other undesirable effects. A lookup table is automatically generated from the battery cell information, and can be provided to devices and/or battery management systems. In an electronic vehicle, for example, a battery management system (BMS) that managers charging of an on-board battery(s) receives a lookup table that corresponds to the on-board battery profile. The BMS then uses the lookup table to apply a charging process that is customized to the on-board battery. In some instances, the lookup table may indicate a particular C-rate at which to charge a battery for specific ranges of SOC.

In embodiments, a method is disclosed for automatically applying a charging profile to a battery cell. A look-up table is received by a battery management system from a remote machine. The look-up table includes optimal charge data generated automatically in response to data obtained from testing a plurality of lithium ion battery cells other than the lithium battery in communication with the battery management system. The optimal charge data can include the optimal C-rate to charge a lithium battery for a specified state of charge. The current state of charge is detected for a lithium ion battery in communication with the battery management system. The lithium ion battery in communication with the battery management system is charged based on the optimal c-rate associated with the detected current state of charge.

In embodiments, a non-transitory computer readable storage medium is disclosed, which has embodied thereon a program, the program being executable by a processor to perform a method for automatically applying a charging profile to a battery cell. The method begins with receiving a look-up table by a battery management system from a remote machine. The look-up table including optimal charge data generated automatically in response data obtained from testing a plurality of lithium ion battery cells other than the lithium battery in communication with the battery management system. The optimal charge data can include the optimal C-rate to charge a lithium battery for a specified state of charge. The current state of charge is detected for a lithium ion battery in communication with the battery management system. The lithium ion battery in communication with the battery management system is charged based on the optimal c-rate associated with the detected current state of charge.

In embodiments, a system is disclosed for automatically applying a charging profile to a battery cell. The system includes a battery management system, a table management module, a detecting module, and a charging component. The battery management system includes one or more processors, memory, and a table management component, detecting component, and charging component stored in memory and executable by the one or more processors. When executed, the table management component receives a look-up table by a battery management system from a remote machine, the look-up table including optimal charge data generated automatically in response data obtained from testing a plurality of lithium ion battery cells not in communication with the battery management system. The optimal charge data includes the optimal C-rate to charge a lithium battery for a specified state of charge. When executed, the detecting component detects the current state of charge for lithium ion batter in communication with the battery management system. When executed, the charging component charges the lithium ion battery in communication with the battery management system based on the optimal charge rate associated with the detected current state of charge.

BRIEF DESCRIPTION OF FIGURES

FIG. 5 is a table having data collected during battery testing.
FIG. 6 is an automatically generated lookup table with customized charging data.

DETAILED DESCRIPTION

Figure 1:
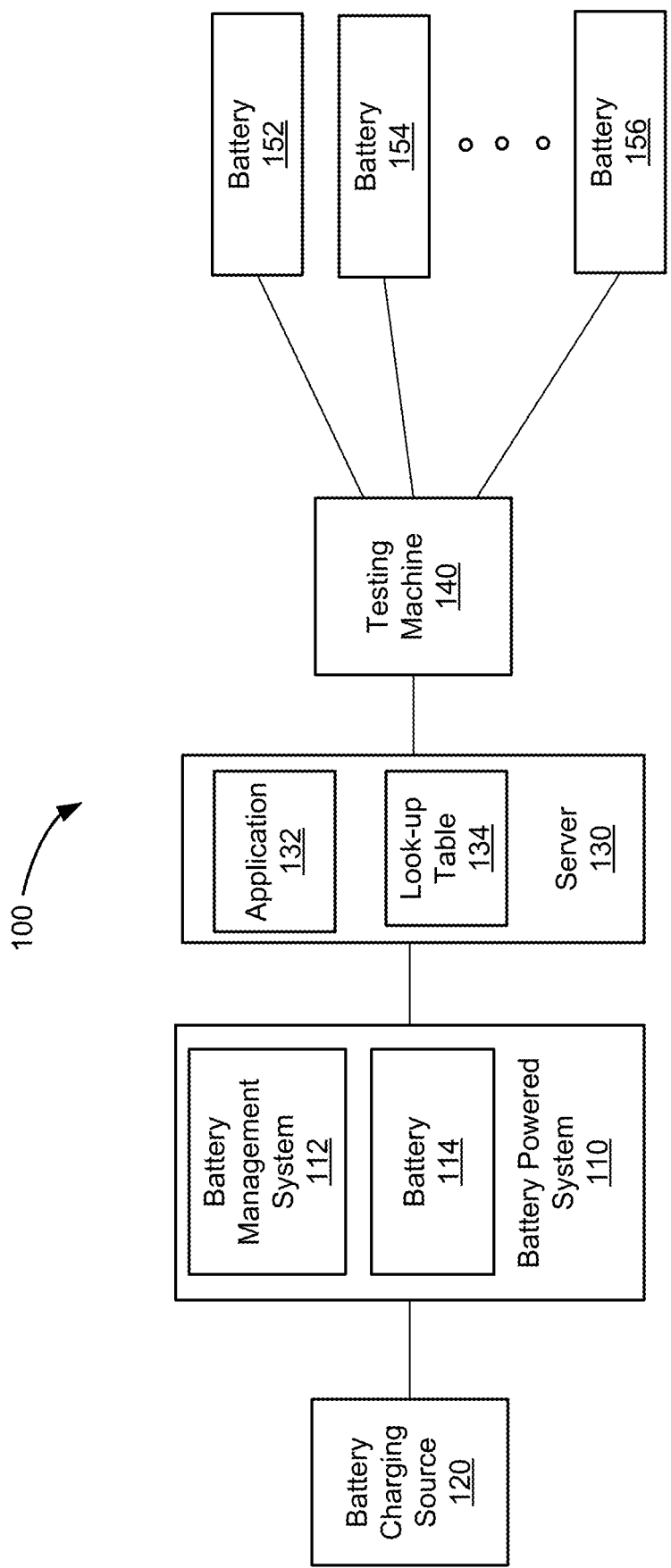
FIG. 1 is a block diagram of a battery charging system.

An improved fast charging method and system is provided for charging lithium-ion battery cells. The improved fast-charging technique automatically generate a customized fast charging process that results in reduced degradation in the battery cell and prolongs the life and continued capacity of the battery. An algorithm for a particular battery cell profile is automatically generated and customized to minimize degradation due to fast charging for that particular batch. To generate the custom algorithm, battery cell information is retrieved for a profile of a battery, wherein each battery profile may have a particular manufacturer, model, type, electrode batch, and potentially other specific identification information. Each battery cell is charged from a particular SOC level and at a selected C-rate, and then discharged. During discharge, the battery cell is monitored for detection of lithium plating or other undesirable effects. A lookup table is automatically generated from the battery cell information, and can be provided to devices and/or battery management systems. In an electronic vehicle, for example, a battery management system (BMS) that managers charging of an on-board battery(s) receives a lookup table that corresponds to the on-board battery profile. The BMS then uses the lookup table to apply a charging process that is customized to the on-board battery. In some instances, the lookup table may indicate a particular C-rate at which to charge a battery for specific ranges of SOC.

The technical problem addressed by the present technology relates to charging a lithium-ion battery while minimizing degradation of the battery components. Lithium-ion batteries are used to provide power for many types of systems, including but not limited to electric vehicles, cellular phones, can computers, and other devices. Reliability is important in all these devices, and any degradation incurred by the battery will affect reliability and ultimately the performance of the device or system. Typical charging techniques involving applying a constant voltage and a constant current at a particular C-rate to charge the battery as quickly as possible. Though the fast charging provides for a shorter than normal time to achieve a charge, such traditional fast charge techniques have the potential to incur severe chemical and mechanical degradation mechanisms within the battery cell. In particular, typical fast-charging techniques cause degradation due to higher currents, higher temperature rise, swelling characteristics of the active materials, the mass transport limitations in the anode, risks of overcharging or excess electrolyte decomposition, and decomposition of lithium metal on the anode.

The present technology provides a technical solution to the technical problem of lithium-ion battery cell degradation caused by typical charging techniques. In particular, the present technology automatically generates a customized battery charging algorithm that is implemented by a battery management system executing on a machine. The battery charging algorithm provides a fast charging process to lithium-ion batteries while reducing or eliminating lithium metal plating caused by typical charging processes. This improves upon prior charging techniques that do not take in account the specific parameters of a lithium-ion battery, but rather apply a universal charging protocol to all batteries, resulting in degradation to the battery cell.

FIG. 1 is a block diagram of a battery charging system 100. Battery charging system 100 include battery-powered system 110, battery charging source 120, server 130, testing machine 140, and batteries 152, 154, and 156. Each of the elements 110-156 may be coupled with and communicate over one or more networks, including but not limited to public networks, private networks, cellular networks, wireless networks, the Internet, an intranet, a WAN, a LAN, a BLUETOOTH or other radio frequency signal, a plain-old-telephone-service (POTS), and/or any other network suitable for communicating digital and/or analog data over.

The elements illustrated in FIGURE are depicted in a manner and organization intended to be exemplary, and it not intended to be limiting. For example, each of battery source 120, server 130, and testing machine 140 may be implemented as one or more machines, servers, logical machines or servers, and may be separately implemented from or completely or partially combined with each other.

The data processing discussed herein is also discussed in a manner and organization intended to be exemplary, and it not intended to be limiting. For example, although an exemplary process is described in which data is retrieved from batteries by testing machine 140, provided to and processed by application 132, and then the processed data in the form of a look-up table is provided to battery management system 112, the data may be retrieved by, processed in whole or in part, and transmitted in raw or processed form between different machines, servers and systems of FIG. 1, as well as by additional machines and servers not illustrated in FIG. 1.

Testing machine 140 may be used to charge, test, and acquire information from batteries 152-156. Though only 3 batteries are shown in communication with testing machine 140, any number of batteries may be connected to testing machine 140 at any time.

Testing machine 140 may also obtain information from the batteries, either before, during, or after charging, as well as monitor their performance during a charging and discharge process. In some instances, testing machine 140 can determine parameter details such as a state of charge (SOC), manufacture, model, batch information for the electrodes, batch information for the electrolytes, and other details for each battery, wherein a specific set of values for the battery parameters may be considered a profile for the battery.

Battery charging performed by testing machine 140 may involve charging each of a plurality of batteries having a matching profile and the same SOC, or within a range of SOC, at an incremental C-rate. For example, for a set of batteries with matching profile and having an SOC of between 30% to 35%, each of the plurality of cells may be charged at a slightly different C-rate.

Once charged, the batteries are allowed to rest or discharge. During discharge, the testing machine 140 monitors the voltage of the batteries to detect abnormalities or conditions, such as for example lithium ion metal plating. The lithium metal plating may be detected as a peak or plateau in the voltage profile during discharge. This is discussed in more detail below with respect to FIGS. 3-4. If lithium-ion metal plating or some other degradation characteristic is detected, the particular C-rate for the SOC for batteries having that profile is identified as being non-optimal. The highest C-rate for a group of batteries within a range of SOC, for which there are no signs of lithium metal plating or other abnormalities, is identified as the optimal C-rate that range of SOC.

Server 130 may be implemented by one or more machines, logical machines, or other combinations of hardware and software, and may operate to receive (may receive pushed data or retrieve requested data) the data obtained by testing machine 140. Server 130 may process the received data to automatically generates a lookup table 134. In some instances, application 132 on server 130 may receive the information from testing machine 140, identify the optimal C-rate for an SOC range for batteries having a particular profile, and create lookup table 134. Each of the lookup tables may correspond to a set of batteries with a particular profile. Application 132 can communicate with various battery-powered systems 110, such as electronic vehicles, computers, mobile phones, and other devices, for example to provide a lookup table 134.

Battery-powered system 110 may include a system or product that utilizes a battery. Examples of a battery-powered system 110 include an electronic vehicle, mobile phone, computer, or some other device that requires power. Battery management system (BMS) 112 may be implemented as hardware and/or software that controls and provides a charging process to a battery 114 on system 110. Battery management system 112 may apply a charging process to the battery 114 through charge provided by charging source 120.

The charging process may be automatically implemented by BMS 112 according to lookup table 134 received from server 130. Battery management system 112 may communicate with application 132 on server 130, battery charging source 120, and other machines and devices. More detail for battery management system 112 is discussed with respect to FIG. 2.

Battery 114 may include a lithium-ion battery associated with a manufacturer, model, type, batch, and other parameters. Though the present technology is discussed with respect to a lithium-ion battery, the specific battery type is meant for purposes of example only, and is not intended to be limiting. The automatically generated customized algorithm and process for charging a battery cell can be applied to different battery types, and any references to a specific battery is done for purposes of discussion only.

Battery charging source 120 may include any suitable source of charge for charging a battery 114. In some instances, in the case of a system 110 implemented as an electronic vehicle, battery charging source 120 may be a dealership, charging pump, or a power outlet commonly found in a home, business or other building. When system 110 is implemented as a phone or computer, a suitable battery charging source 120 may include a mobile charging pack, car charger, or power outlet found in a home, business or other building.

Figure 2:
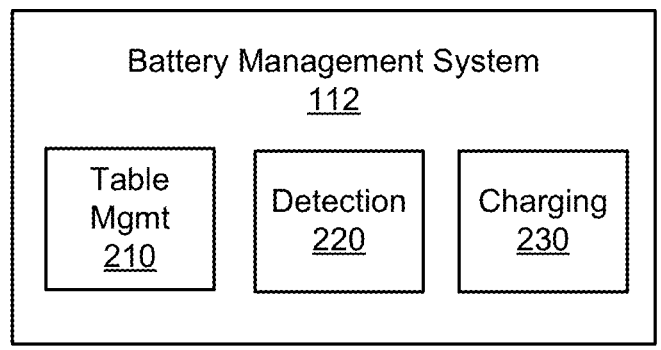
FIG. 2 is a block diagram of a battery management system.

FIG. 2 is a block diagram of a battery management system (BIM) 112. System 112 of FIG. 2 provides more detail for battery management system 112 of the FIG. 1. BIM 112 of FIG. 2 includes table management 210, detection 220, and charging 230. Each of 210-230 may be implemented as software modules. stored in memory on a single machine or distributed over a plurality of machines, and executed by one or more processors to implement functionality discussed herein. Each of 210-230 may also be implemented as a combination of software and hardware, either on a single machine or distributed over several machines, to implement the functionality discussed herein.

Table management 210 may retrieve a lookup table 134 from server 130. Table management 210 may also store the retrieved look-up table locally at BIM 112, access and read from the table, and use the table data to implement a battery charging process. Detection 220 may be used to detect information from a battery cell to be charged. The detected information may include the battery cell manufacturer, model, type, batch information for the electrode, electrolytes, and other cell components, and other information stored on or otherwise associated with and retrievable battery 114. The detected battery information may be compared to the look-up table profile data to confirm that the charging process to be applied is appropriate to battery 114.

Charging 230 manages charging of battery 114 according to information in look-up table 134. Charging 230 sets the voltage and current at which to charge the battery 114 at different times, depending on the state of charge for the battery and the current temperature. The particular voltage and current values are derived from the C-rate.

Figure 3:
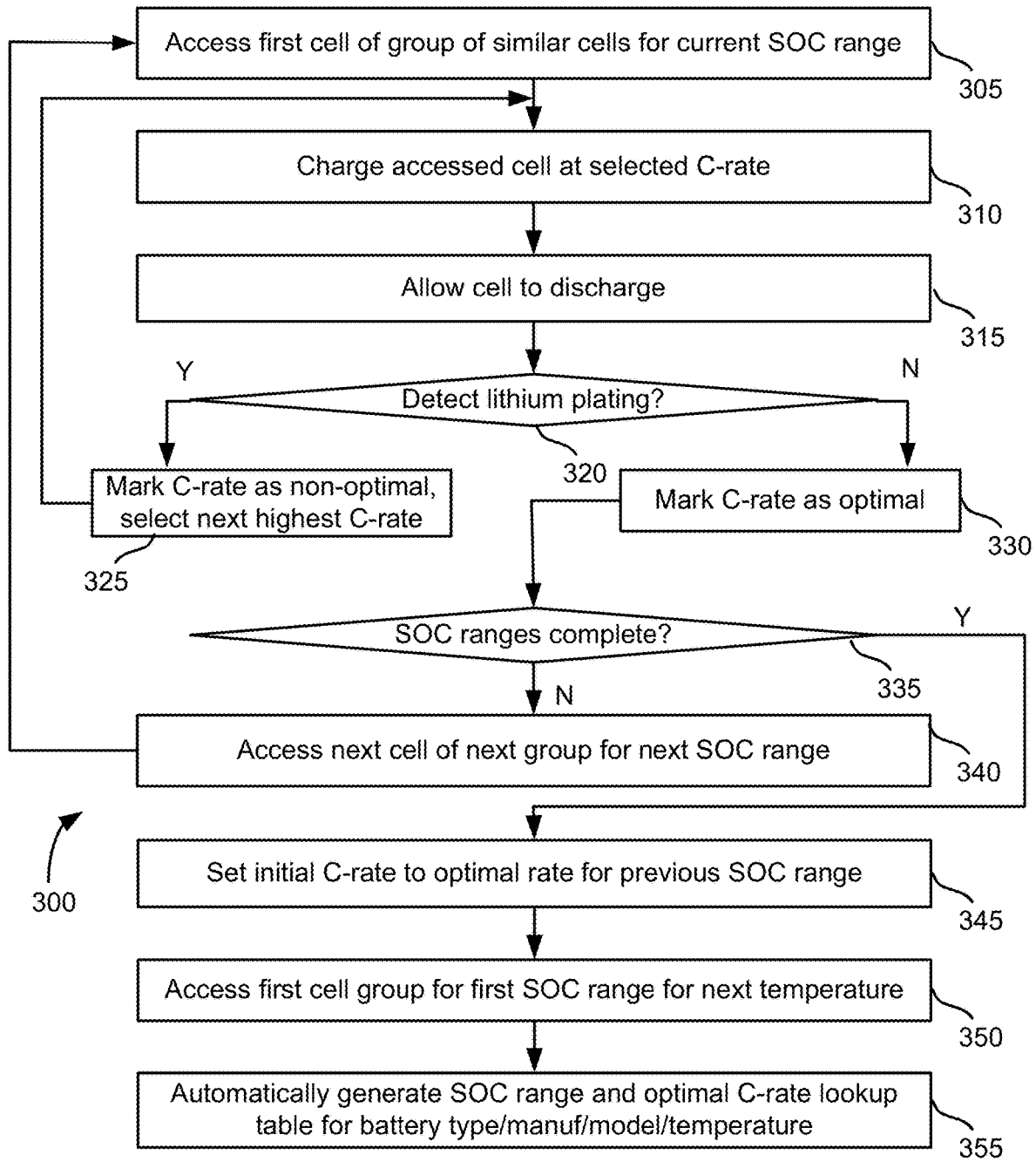
FIG. 3 is a method for testing a battery.

FIG. 3 is a method for testing a battery. The method of FIG. 3 begins with accessing a first battery cell of a group of similar battery cells (e.g., cells with a similar or same profile value) for a current SOC range at step 305. In some instances, testing machine 140 can be used to test a group of cells having a profile with the same manufacturer, type, model, and batch, wherein a subset of those cells which each have the same SOC or are within a range of SOC. For example, in the table of FIG. 5, a first subset of battery cells identified as cells 1, 2, and 3 have an SOC of 1, 20 and 22, all within the range of 0% to 30%.

The first accessed cell of the group for a current SOC range is charged at a first C-rate at step 310. In some instances, the selected cell is charged at selected C-rate until it is fully charged. The charged cell is allowed to discharge or rest at step 315. During discharge, the voltage of the cell is monitored by testing machine 140. A determination is made as to whether the discharging cell exhibits characteristics that suggest degradation such as lithium ion metal plating at step 320.

Figure 4:
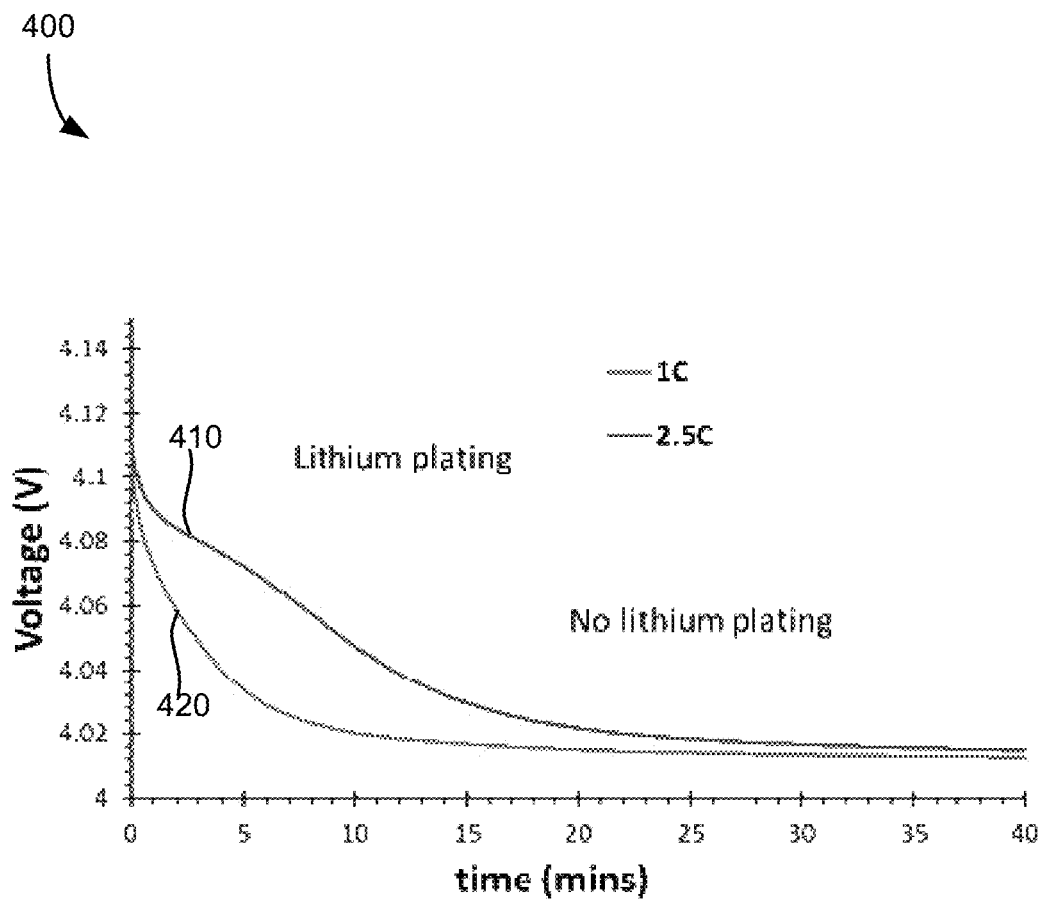
FIG. 4 is a plot showing voltage levels for a battery during battery discharge.

FIG. 4 is a plot showing voltage levels during discharge for battery cells. As a battery cell discharges over time, the voltage decreases as shown in the two plots of FIG. 4. Plot 410 illustrates a discharge of a battery cell at a C-rate of 2.5 C. For plot 410, it can be seen that there is a slight plateau during the discharge pattern, indicating the presence of lithium ion metal plating. Plot 420 illustrates a discharge for a battery cell that was charged at a C-rate of 1 C. As shown, the discharge plot with this battery cell does not exhibit any peak or plateau, indicating there is no lithium plating occurring due to the charge at the particular C-rate.

Returning to the method of FIG. 3, if no lithium plating is detected at step 320, the C-rate used to charge the battery cell may be identified as an optimal C-rate for that particular SOC range, and the method of FIG. 3 may continue to step 335. If lithium plating is detected at 320, the C-rate used to charge that cell is identified is not optimal at step 325, the next highest C-rate for that SOC range is selected, and the method returns to step 310 where another battery cell is charged at the new selected C-rate.

A determination is made at step 335 as to whether the testing for all SOC ranges is complete. If all SOC ranges have been completed, the process is repeated at a different temperature. If all SOC ranges for the battery profile have not been tested, a battery cell from the next group of cells for the next SOC range but for a different temperature is selected, and the method of FIG. 3 returns to step 305. Hence, the initial C-rate for the optimal rate for the previous SOC ranges are set at step 345, and a first cell group for the first SOC range is selected for the next temperature at step 350. Once all data is collected for all temperatures and all SOC values or ranges, and SOC range and optimal C-rate lookup table may be automatically generated or the tested batteries.

The lookup table may be automatically generated by application 132 when the raw testing data is provided by testing machine 142 application 132. In particular, application 132 may receive identifying information for a particular battery, parameters and/or profile data for the battery, the original SOC of the battery, voltage levels during discharge of the battery, and the temperature at which the battery was operating, charged, and discharged at. Application 132 may retrieve this information, identify the optimal C-rate for the SOC, and create the lookup table with those optimal values plugged into the table. In some instances, a lookup table may be generated not only for battery parameters at a particular temperature of operation, but also at different points in the lifecycle for the battery. For example, the profile data may be generated for the battery immediately before installing the battery, towards the middle of the battery lifecycle, and towards the end of the battery lifecycle, as well as other points during the battery cell lifecycle.

FIG. 5 is a table with data collected during battery testing. The data within the table of FIG. 5 may be retrieved by application 132 from testing machine 140. The data retrieved from testing machine 140 may include battery cell identification information, the SOC for the particular cell, a C-rate used to charge particular cell, and voltage data for the cell collected during battery cell discharge. In table of FIG. 5, each battery cell is identified with a number. In addition to a number, other data received for each battery cell (not illustrated in table FIG. 5) including battery cell manufacture, model, type, electrode batch, electrolyte batch, serial number, and other data. The SOC may be retrieved from the testing machine 140 for each battery and provided to application 132. The rate at which testing machine 140 charged a particular battery may also be provided to application 132.

As each battery tested by testing machine 140 is discharged, a sampling of the voltage is collected and provided to application 132. Application 132 may then determine whether any plateau or peak in the voltage is detected, indicating that metal plating is occurring in the particular lithium-ion battery cell. Application 132 may use this information to indicate which of the applied C-rates is the optimal C-rate, as illustrated in the rightmost column in the table of FIG. 5. Other data may also be retrieved by application 132 from testing machine 140, including but not limited to other battery cell information, the temperature at which the battery cell under test was charged and discharged, and other data. Based on the retrieved information, application 132 may automatically generate a lookup table 134.

FIG. 6 is an automatically generated lookup table 600 with custom charging data. The charging data is customized for a battery cell having a particular and at a particular temperature. The lookup table of FIG. 6 may be generated from data collected from testing machine 140, such as for example the data within the table of FIG. 5. The lookup table of FIG. 6 includes columns of SOC, C-rate, voltage, and current. The SOC provides the upper boundary of each SOC range for which battery cells were tested. For example, for the SOC of 50 in column one, this provides information for an SOC range of 0 to 50. The other SOC values in the lookup table include 55, 65, 70, 75, and 80. The specific SOC ranges in table 6 are exemplary, and more or fewer ranges may be used in look-up tables.

The second column in lookup table 600 is for optimal C-rate. For each SOC range, the optimal C-rate is listed. The optimal C-rate is retrieved from data generated by application 132 (for example, in the format of table 500 of FIG. 5). In particular, for the subset of battery cells with IDs 1-3, for the SOC range of 0-30 in table 500, metal plating was detected for a C-rate of 1.5, but no plating was detected for C-rates of 1.4 and 1.3. Therefore, the optimal C-rate for the 0-30 SOC range is 1.4, the highest C-rate for which no plating was detected. As shown in table 600, the optimal C-rates for the particular SOC ranges are two, 1.6, 1.4, 1.3, 1.0, and 0.9. The voltage column and current column of table 600 indicate the voltage to be applied to a battery cell and current to be applied to the battery cell based on the C-rate.

Figure 7:
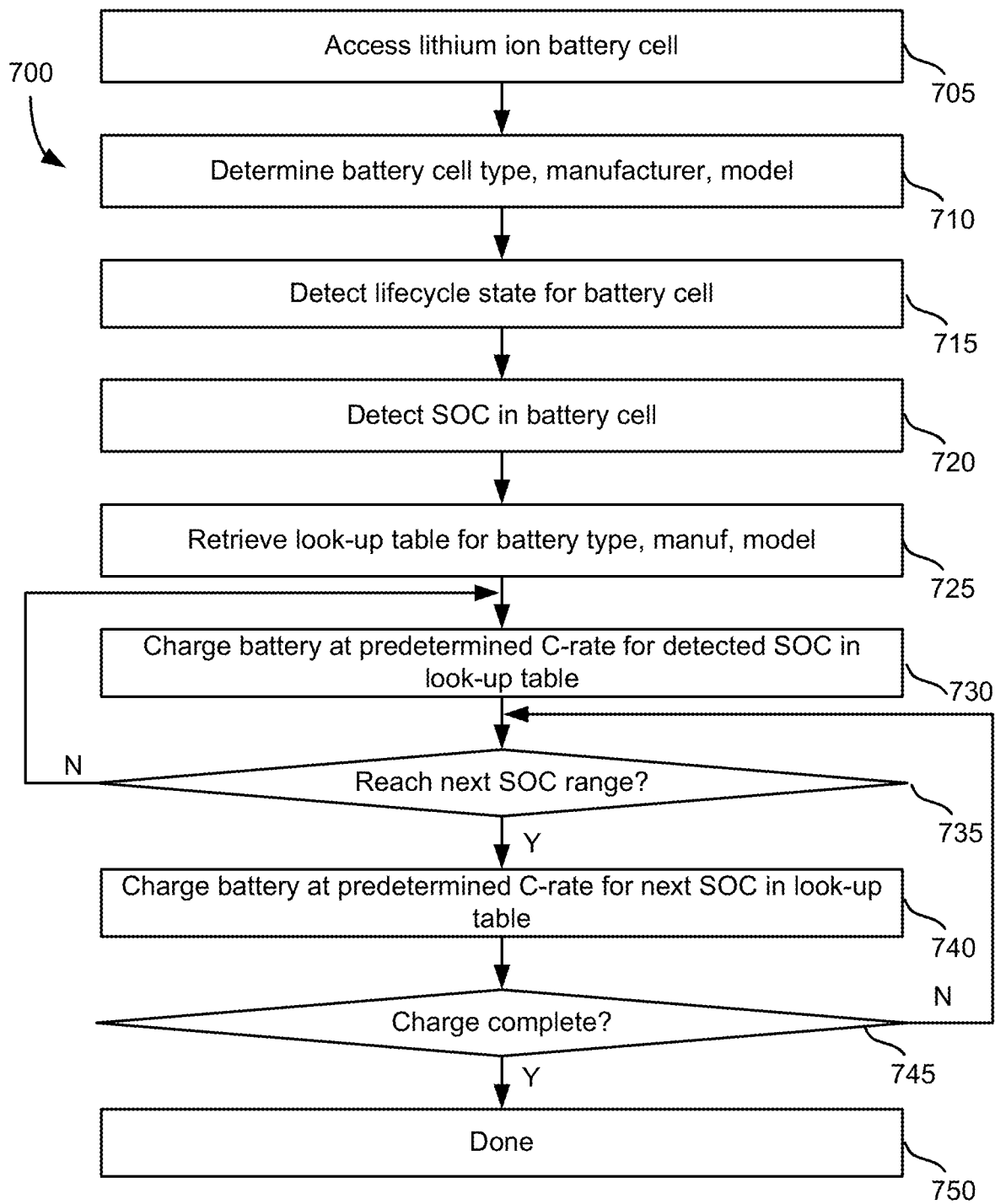
FIG. 7 is a method for a customized charging technique.

FIG. 7 is a method for applying a custom charging technique. The process of FIG. 7 may be used to charge battery 114 by battery charging source 120 as controlled by battery management system 112. First, a lithium-ion battery cell is accessed at step 705. Accessing the battery cell may include connecting battery charging source 122 to batter powered system 110 such that battery 114 may be charged under control of the BMS 112. Battery cell type, manufacturer, model, and optionally other data may be determined at step 710. Information may be determined by battery management system 112 for battery 114. The data may be determined to confirm that the custom battery charging process to be applied based on lookup table 134 will be applied to an appropriate batter that has a matching profile. In some instances, the lifecycle state of the battery may also be detected at step 715. In some instances, a particular lookup table may be applied for a particular lifecycle state, such as beginning, middle, and end of the lifecycle for the battery. Determining this information at step 715 may be used to confirm that the correct charging process is used for the current battery.

The current state of charge for the battery is detected at step 720. A lookup table for the battery profile is retrieved at step 725. The lookup table may be retrieved for the particular battery type, manufacturer, model, batch (e.g., battery profile), temperature, and lifecycle state.

Charge may be applied to the accessed battery at a predetermined C-rate for the detected SOC and temperature for the particular profile of battery at step 730. The predetermined C-rate is retrieved from a lookup table based on the detected SOC and temperature for the particular battery profile. Charging is monitored, including the current state of charge for the battery as the batteries being charged. A determination is made as to whether the next SOC range specified in the lookup table is reached at step 735. For example, with respect to table 600, a first SOC range is 0 to 50 (indicated by the value 50 in the SOC column), and the next SOC range is 51 to 55, wherein the SOC ranges are associated with C-rates of 2 and 1.6, respectively. When the battery being charged exceeds the upper limit of the SOC range associated with the current C-rate, the C-rate for the next SOC range is retrieved and battery charging continues with that C-rate. Hence, with respect to the lookup table 600 of FIG. 6, when the SOC for the battery changes from 50 to 51, the C-rate will change from 2 to 1.6. While the SOC range remains within the same range, the method of FIG. 7 maintains in the loop at step 735 and step 730.

If the charging of the battery is complete at step 745, the method of FIG. 7 is done at step 750. If charging is not complete, battery management system 112 continues to monitor whether the SOC for the battery being charged reaches a new SOC range at step 735.

Figure 8:
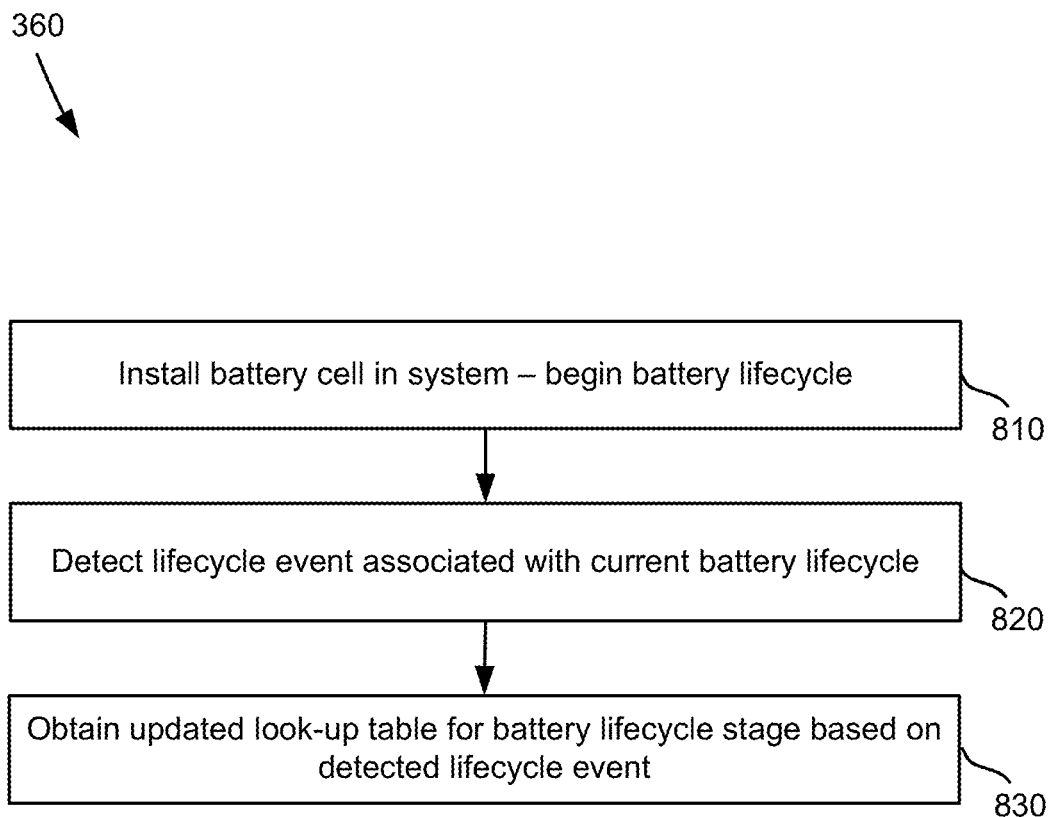
FIG. 8 is a method for retrieving updated lookup table data.

The present technology is discussed with respect to testing lithium-ion battery cells in order to determine targeted and customized charging algorithms for the particular battery cell profile. In some instances, the targeted and customized charging algorithm may be determined at different stages in the lifecycle of a battery cell. When the custom algorithm for charging a particular battery profile is available for different battery cell lifecycles, batteries in use may be provided with updated charging algorithms at different points in their lifecycle. FIG. 8 is a method for retrieving updated lookup table data. First, a battery cell is installed in the system and it begins its lifecycle at step 810. As the battery is used, lifecycle events may be detected which are associated with the current battery lifecycle at step 820. The lifecycle events may include a number of hours used, a number of charges applied to the cell, a period of time, or a combination of these events. In response to detecting the one or more lifecycle events at step 820, and updated lookup table for the particular battery lifecycle stage is obtained at step 830. The lookup table may be specific to the battery profile, temperature, and lifecycle stage of the battery. In some instances, the battery-powered system 110 may obtain the updated lookup table by retrieving the table over a network from server 130. In some instances, the battery-powered system 110 may simply provide data to server 130, such as the number of charges or number of hours has experienced, and server 130 may push the lookup table appropriate for the batteries lifecycle to system 110. In other profiles, the different lookup tables may be installed in battery-powered system 110 in a different manner or time, such as during production, maintenance services, or in other ways.

Figure 9:
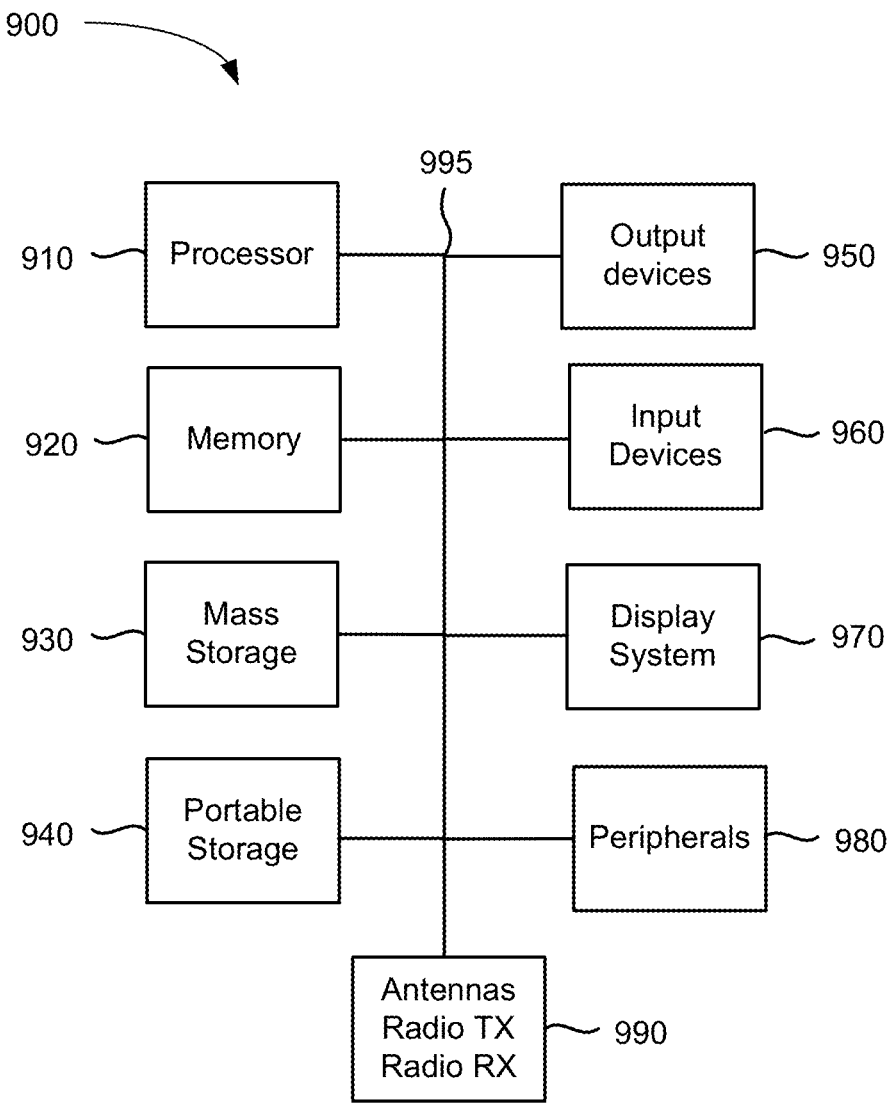
FIG. 9 is a block diagram of a computing environment for implement in the present technology.

FIG. 9 is a block diagram of a computing environment for implement in the present technology. System 900 of FIG. 9 may be implemented in the contexts of the likes of machines that implement battery charging source 120, battery powered system 110, server 130, testing machine 140. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information and processes the information for output to the display device. Display system 970 may also receive input as a touch-screen.

Peripherals 980 may include any type of computer support device to add additional functionality to the computer system. For example, peripheral device(s) 980 may include a modem or a router, printer, and other device.

The system of 900 may also include, in some implementations, antennas, radio transmitters and radio receivers 990. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for automatically applying a charging profile to a battery cell, comprising:

receiving a look-up table by a battery management system from a remote machine, the look-up table including optimal charge data generated automatically in response to data obtained from testing a plurality of lithium ion battery cells other than a lithium ion battery in communication with the battery management system, the optimal charge data including an optimal C-rate to charge a lithium ion battery for a specified state of charge;

detecting a current state of charge for the lithium ion battery in communication with the battery management system; and charging the lithium ion battery in communication with the battery management system based on an optimal charge rate associated with the detected current state of charge;

wherein the plurality of lithium ion battery cells have the same manufacturer, model, and electrode batch, the optimal charge data derived in part by monitoring the plurality of lithium ion battery cells for detection of lithium plating during discharge, the lithium ion battery in communication with the battery management system having the same manufacturer, model, and electrode batch as the plurality of lithium ion battery cells;

wherein an updated look-up table is received by the battery management system at least two times during a lifecycle of the lithium ion battery in communication with the battery management system.

2. The method of claim 1, further comprising:
monitoring the state of charge during charging of the lithium ion battery in communication with the battery management system;
detecting that a subsequent state of charge during charging of the lithium ion battery is associated with a different C-rate; and
charging the lithium ion battery in communication with the battery management system based on the optimal C-rate associated with the subsequent state of charge.

3. The method of claim 1, wherein the optimal charge data includes optimal C-rate to charge a lithium ion battery for a specified state of charge at a particular temperature, the lithium ion battery in communication with the battery management system charged based on the optimal charge rate associated with the detected current state of charge and a current temperature.

4. The method of claim 1, wherein the optimal C-rate is a maximum C-rate for a particular state of charge for the same manufacturer and model at which the lithium ion battery will not experience lithium plating.

5. The method of claim 1, wherein the lithium ion battery in communication with the battery management system is used in an electric vehicle.

6. A non-transitory computer readable storage medium having embodied thereon a program, the program being executable by a processor to perform a method for automatically applying a charging profile to a battery cell, the method comprising
receiving a look-up table by a battery management system from a remote machine, the look-up table including optimal charge data generated automatically in response to data obtained from testing a plurality of lithium ion battery cells not in communication with the battery management system, the optimal charge data including an optimal C-rate to charge a lithium ion battery for a specified state of charge;
detecting a current state of charge fora lithium ion battery in communication with the battery management system; and
charging the lithium ion battery in communication with the battery management system based on an optimal charge rate associated with the detected current state of charge;
wherein the plurality of lithium ion battery cells have the same manufacturer, model, and electrode batch, the optimal charge data derived in part by monitoring the plurality of lithium ion battery cells for detection of lithium plating during discharge, the lithium ion battery in communication with the battery management system having the same manufacturer, model, and electrode batch as the plurality of lithium ion battery cells;
wherein an updated look-up table is received by the battery management system at least two times during a lifecycle of the lithium ion battery in communication with the battery management system.

7. The non-transitory computer readable storage medium of claim 6, the method further comprising:
monitoring the state of charge during charging of the lithium ion battery in communication with the battery management system;
detecting that a subsequent state of charge during charging of the lithium ion battery is associated with a different C-rate; and
charging the lithium ion battery in communication with the battery management system based on the optimal C-rate associated with the subsequent state of charge.

8. The non-transitory computer readable storage medium of claim 6, wherein the optimal charge data includes optimal C-rate to charge a lithium ion battery for a specified state of charge at a particular temperature, the lithium ion battery in communication with the battery management system charged based on the optimal charge rate associated with the detected current state of charge and a current temperature.

9. The non-transitory computer readable storage medium of claim 6, wherein the optimal C-rate is a maximum C-rate for a particular state of charge for the same manufacturer and model at which the lithium ion battery will not experience lithium plating.

10. The non-transitory computer readable storage medium of claim 6, wherein the lithium ion battery in communication with the battery management system is used in an electric vehicle.

11. A system for automatically applying a charging profile to a battery cell, comprising:
a battery management system comprising one or more processors, memory, and a table management component, a detecting component, and a charging component stored in the memory and executable by the one or more processors to:
receive, by the table management component, a look-up table by the battery management system from a remote machine, the look-up table including optimal charge data generated automatically in response to data obtained from testing a plurality of lithium ion battery cells not in communication with the battery management system, the optimal charge data including an optimal C-rate to charge a lithium ion battery for a specified state of charge;
detect, by the detecting component, a current state of charge fora lithium ion battery in communication with the battery management system; and
charge, by the charging component, the lithium ion battery in communication with the battery management system based on an optimal charge rate associated with the detected current state of charge;
wherein the plurality of lithium ion battery cells have the same manufacturer, model, and electrode batch, the optimal charge data derived in part by monitoring the plurality of lithium ion battery cells for detection of lithium plating during discharge, the lithium ion battery in communication with the battery management system having the same manufacturer, model, and electrode batch as the plurality of lithium ion battery cells;
wherein an updated look-up table is received by the battery management system at least two times during a lifecycle of the lithium ion battery in communication with the battery management system.

12. The system of claim 11, the one or more processors further configured to execute code, stored in the memory, to perform a method comprising:
monitoring the state of charge during charging of the lithium ion battery in communication with the battery management system;
detecting that a subsequent state of charge during charging of the lithium ion battery is associated with a different C-rate; and charging the lithium ion battery in communication with the battery management system based on the optimal C-rate associated with the subsequent state of charge.

13. The system of claim 11, wherein the optimal charge data includes optimal C-rate to charge a lithium ion battery for a specified state of charge at a particular temperature, the lithium ion battery in communication with the battery management system charged based on the optimal charge rate associated with the detected current state of charge and a current temperature.

14. The system of claim 11, wherein the optimal C-rate is a maximum C-rate for a particular state of charge for the same manufacturer and model at which the lithium ion battery will not experience lithium plating.

15. The system of claim 11, wherein the lithium ion battery in communication with the battery management system is used in an electric vehicle.

* * * * *